United States Patent [19]

Nagatsuka

[11] Patent Number: 5,587,859
[45] Date of Patent: Dec. 24, 1996

[54] RECORDING AND/OR REPRODUCING APPARATUS HAVING ROTARY TRANSFORMER

[75] Inventor: Osamu Nagatsuka, Kanagawa-ken, Japan

[73] Assignee: Canon Kabushiki Kaisha, Tokyo, Japan

[21] Appl. No.: 289,090

[22] Filed: Aug. 11, 1994

[30]     Foreign Application Priority Data

Aug. 31, 1993  [JP]  Japan .................................... 5-239176

[51] Int. Cl.$^6$ ..................................................... G11B 5/52
[52] U.S. Cl. ..................................................... 360/108
[58] Field of Search ..................................... 360/108, 107

[56]                    References Cited

U.S. PATENT DOCUMENTS 4,609,960  9/1986  Fujioka ........................... 360/107 X
4,914,537  4/1990  Ota ..................................... 360/108
4,926,273  5/1990  Tabuchi et al. ...................... 360/108
5,363,263  11/1994 Ohji et al. ........................... 360/108

FOREIGN PATENT DOCUMENTS 62-26604  2/1987  Japan ................................... 360/108
62-67701  3/1987  Japan ................................... 360/108

*Primary Examiner*—John H. Wolff
*Attorney, Agent, or Firm*—Robin, Blecker, Daley & Driscoll

[57]                       ABSTRACT

In a rotary transformer arranged to transmit signals between a rotor and a stator, windings which correspond to a plurality of channels are integrally formed. After the integrally formed windings are secured to the rotor and the stator, the integrally formed windings are separated and divided into the windings of the plurality of independent channels.

16 Claims, 5 Drawing Sheets

RECORDING AND/OR REPRODUCING APPARATUS HAVING ROTARY TRANSFORMER

BACKGROUND OF THE INVENTION

1. Field of the Invention

This invention relates to a recording and/or reproducing apparatus using a rotary head, such as a home video recorder, and more particularly to a rotary transformer arranged in the recording and/or reproducing apparatus to transfer signals between the rotary head and a stationary device.

2. Description of the Related Art

The recording and/or reproducing apparatus of the above-stated kind includes a cylinder device 50 which has a rotary head 52 as shown in FIG. 1. The rotary head 52 is secured to a base 54 and is further secured to a rotary cylinder 56. Information can be recorded and/or reproduced by using the rotary head 52 on or from a magnetic tape which is wrapped around the cylinder device 50. The information is transferred through a rotary transformer 60.

The rotary transformer 60 consists of a stator 60a which is secured to a stationary cylinder 58 on the side of the body of the cylinder device and a rotor 60b which is mounted on the rotary cylinder 56. As shown in FIG. 2, in the conventional rotary transformer 60, each of the stator 60a and the rotor 60b is composed of a core 11.

The core 11 is formed in a disk-like shape with an oxide magnetic substance consisting of ferrite of an Ni-Zn system. A hole 12 is provided in the middle part of the core 11 for inserting a rotary shaft 70 (FIG. 1). A plurality of ring-like winding grooves 13 are arranged concentrically with the hole 12 on a face 11a which is one end face of the core 11 and is opposed to another face. In the case of this illustration, the rotary transformer has two channels. In this case, two winding grooves 13a and 13b are formed, one on the inner circumferential side and the other on the outer circumferential side. Winding 14 is applied to the inside of each of these winding grooves 13. A groove 13' is formed between the winding grooves 13a and 13b. A short-circuit ring 15 is arranged inside the groove 13' to suppress a crosstalk between the two channels.

The core 11 is manufactured, using a Ni-Zn ferrite powder with some binder added, by molding at high pressure, by baking at high temperature and then with some machining process applied as necessary. As mentioned above, the windings 14 (and the short-circuit ring 15) are applied to the inside of the winding grooves 13 (and the groove 13'). A coil to be used for the rotary transformer is made of, for example, a self-welding type copper (Cu) wire which is coated with a polyurethane (PUR) film. The copper wire measures only 0.1 to 0.2 mm. The lead wire end of such a thin wire is not in a fixed shape. The coil of such wire is fixed by means of a suitable adhesive 16.

FIG. 3 shows by way of example the details of an arrangement made at a part of each winding 14 where the wire is pulled out from the core 11. As shown in FIG. 3, the winding 14 is arranged to be pulled out through a hole 17 to one side of the core 11 located opposite to the above-stated opposed face 11a.

The flat type rotary transformer shown in FIG. 2 further includes a terminal 18 and a holder 19 in addition to the core 11. The holder 19 must excel in heat resistivity and moldability. To meet such requirements, the holder 19 is made of a molding material such as a liquid crystal polymer or a PPS (polyphenylene sulfide) resin. The winding 14 pulled out through the hole 17 is wound around a suitable part of the terminal 18. After being wound around the terminal 18 of the holder 19, the winding 14 is fixed by soldering with a solder 20.

The conventional rotary transformer which is arranged in this manner, however, necessitates the thin copper wire to be accurately connected with great care, particularly in processing it at the part where it is to be pulled out (see FIG. 3). This work has been extremely troublesome. Particularly, the recent trend of further reduction in size makes the cementing and soldering work on the winding 14 very difficult. Such work has become impossible without recourse to the manual work of skilled workers. As a result, the ratio of the cost of assembly to the total cost of the product has become much higher than the cost of the part. The cost of assembly thus has been a great impediment to the reduction of cost.

Further, since a high-cost material such as a liquid crystal polymer or PPS resin material is used for the holder 19, the cost of manufacture of the conventional rotary transformer has been increased also by the use of such a material.

SUMMARY OF THE INVENTION

This invention is developed to solve the above-stated problems of the conventional device. It is, therefore, an object of this invention to provide a rotary transformer for a recording and/or reproducing apparatus which permits the reduction of cost to a great extent and yet ensures adequate performance of its function.

To attain this object, a rotary transformer arranged according to this invention to transmit signals between a rotor and a stator includes a pair of cores arranged to form the rotor and the stator, each of said pair of cores being in a cylindrical shape, and a plurality of windings secured to one end face of each of the pair of cores. Each of the plurality of windings is in a flat plate shape. The center of each of the windings approximately coincides with the center of each of the pair of cores. The plurality of windings differ in coil diameter. The windings are respectively provided with protruding parts which are aligned in a radial direction of the cores.

To attain the object from a different point of view, a rotary cylinder device having a head for recording and/or reproducing information on or from a tape is arranged according to this invention to include a rotary cylinder having the head mounted thereon, a stationary cylinder arranged to rotatably support the rotary cylinder, and a rotary transformer. The rotary transformer includes a rotor which is in a cylindrical shape and is mounted on the rotary cylinder, a stator which is in a cylindrical shape and is mounted on the stationary cylinder and a plurality of windings which are secured to each of respective opposed faces of the rotor and the stator. Each of the plurality of windings is in a flat plate shape and the center of each of the windings approximately coincides with the center of the rotor. The plurality of windings differ in coil diameter. The plurality of windings are respectively provided with protruding parts which are aligned in the radial direction of the rotor and that of the stator.

To attain the object from another different point of view, a recording and/or reproducing apparatus having a head for recording and/or reproducing information on or from a tape is arranged according to this invention to include a rotary cylinder having the head mounted thereon, a stationary cylinder arranged to rotatably support the rotary cylinder, and a rotary transformer. The rotary transformer includes a rotor which is in a cylindrical shape and is mounted on the rotary cylinder, a stator which is in a cylindrical shape and is mounted on the stationary cylinder and a plurality of windings which are secured to each of respective opposed faces of the rotor and the stator. Each of the plurality of windings is in a flat plate shape and the center of each of the windings approximately coincides with the center of the rotor. The plurality of windings differ in coil diameter. The plurality of windings are respectively provided with protruding parts which are aligned in the radial direction of the rotor and that of the stator.

To attain the object from a further different point of view, a method for manufacturing a rotary transformer according to this invention comprises the steps of integrally forming a plurality of windings in a shape of being interconnected by a connecting part, securing the integrally formed plurality of windings to a core, and separating the plurality of windings from each other by dividing the connecting part.

The above and other objects and features of this invention will become apparent from the following detailed description of embodiment thereof taken in connection with the accompanying drawings.

DETAILED DESCRIPTION OF THE PREFERRED EMBODIMENT

Figure 1:
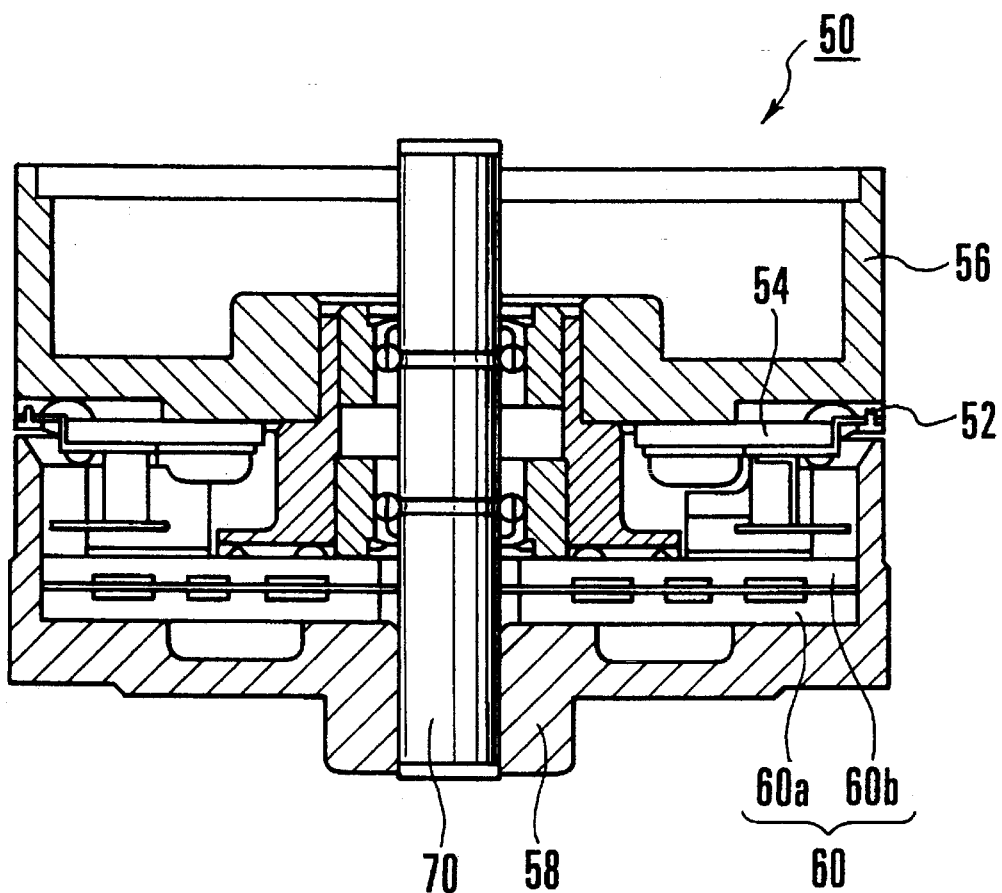
FIG. 1 shows a rotary cylinder to which a rotary transformer is applied.
Figure 2:
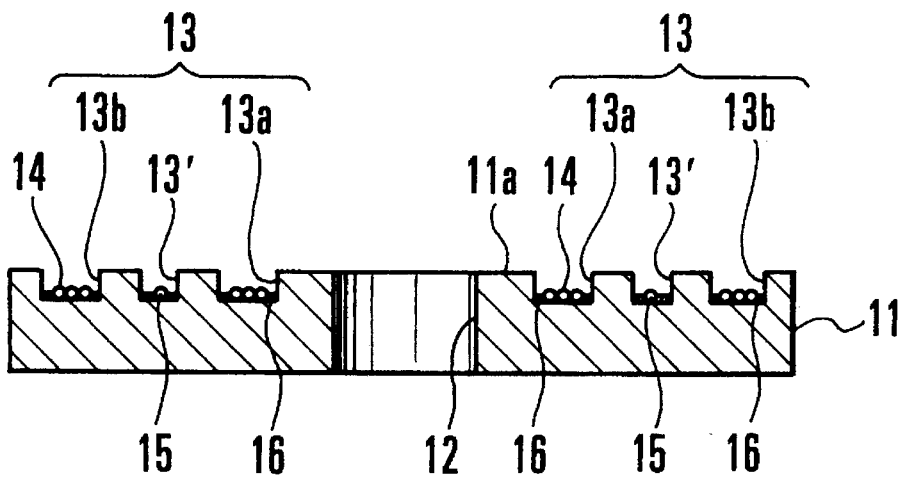
FIG. 2 is a vertical sectional view showing a core arranged in the conventional rotary transformer.
Figure 3:
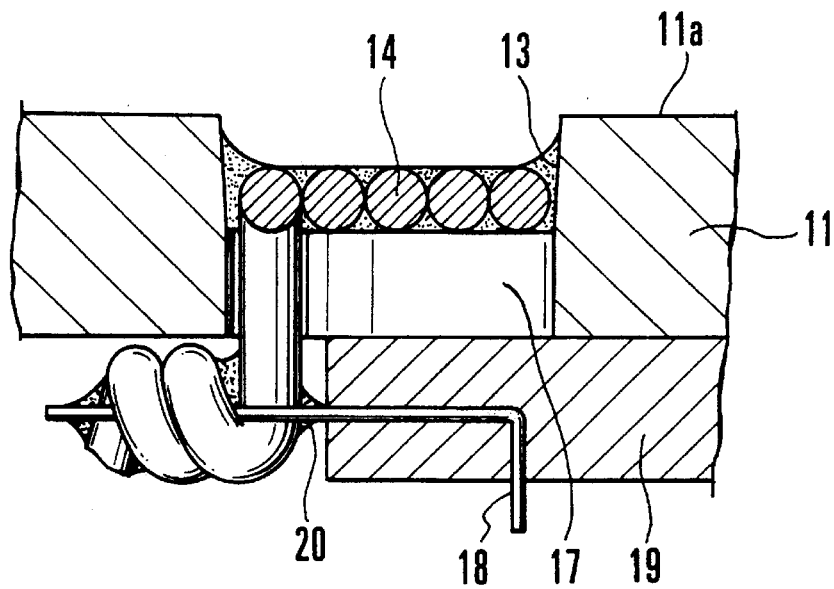
FIG. 3 is a vertical sectional view showing in detail the arrangement of a part through which the winding of the conventional rotary transformer is inserted.
Figure 4:
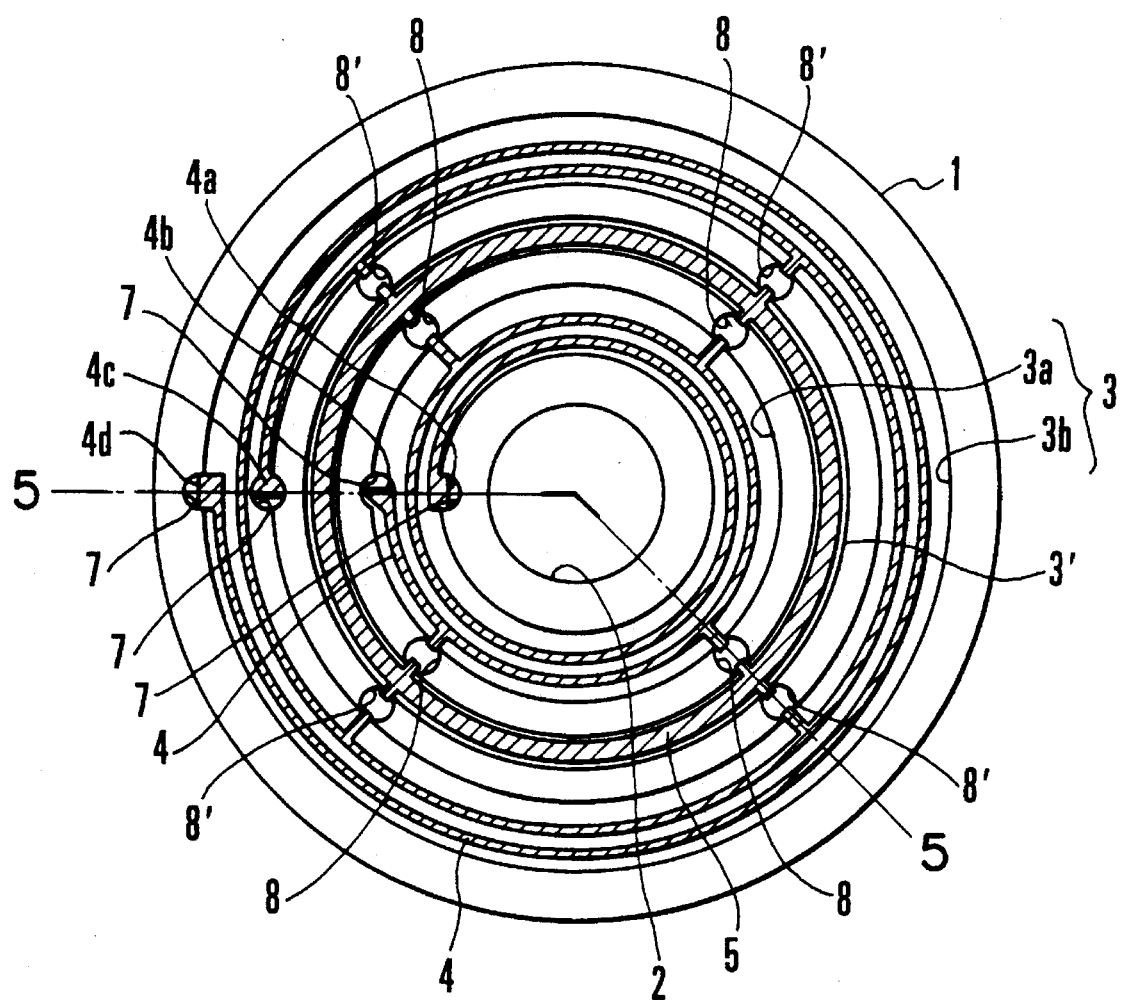
FIG. 4 is a plan view showing a rotary transformer arranged in a recording and/or reproducing apparatus as an embodiment of this invention.
Figure 5:
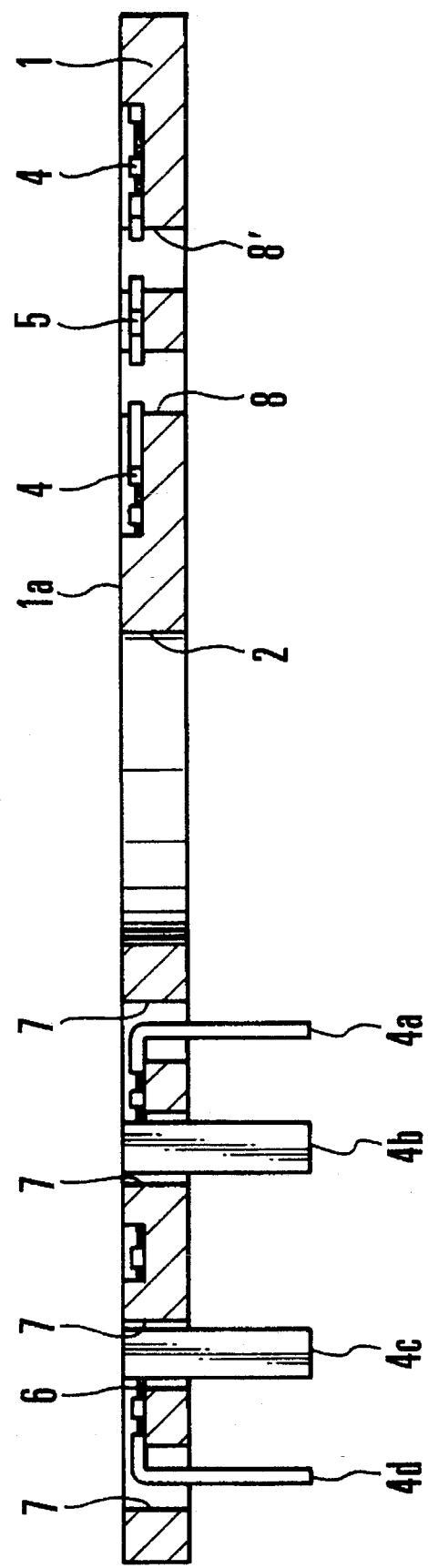
FIG. 5 is a sectional view taken along a line A—A shown in FIG. 4.
Figure 6:
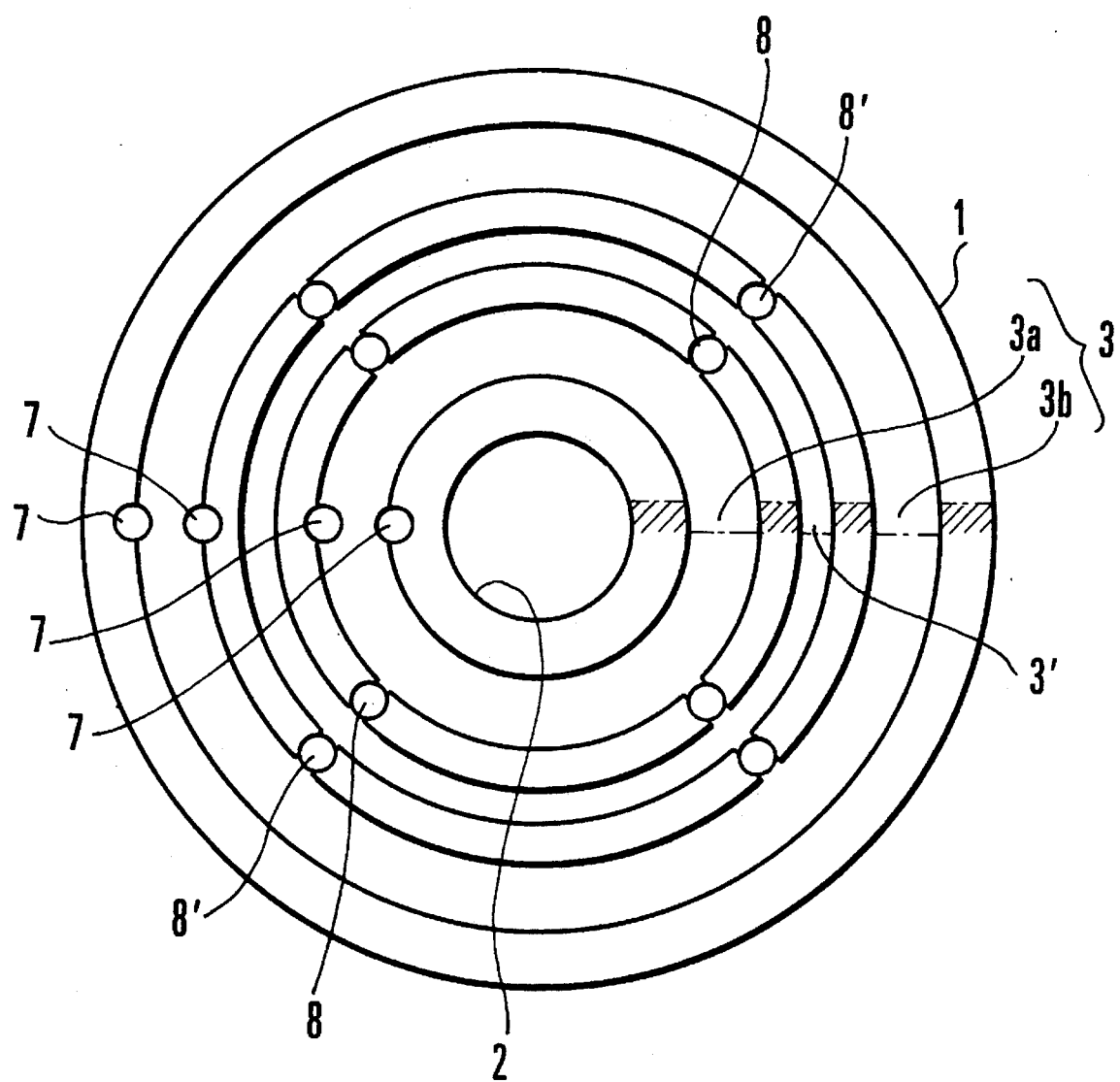
FIG. 6 is a plan view showing a core related to the rotary transformer of this invention.
Figure 7:
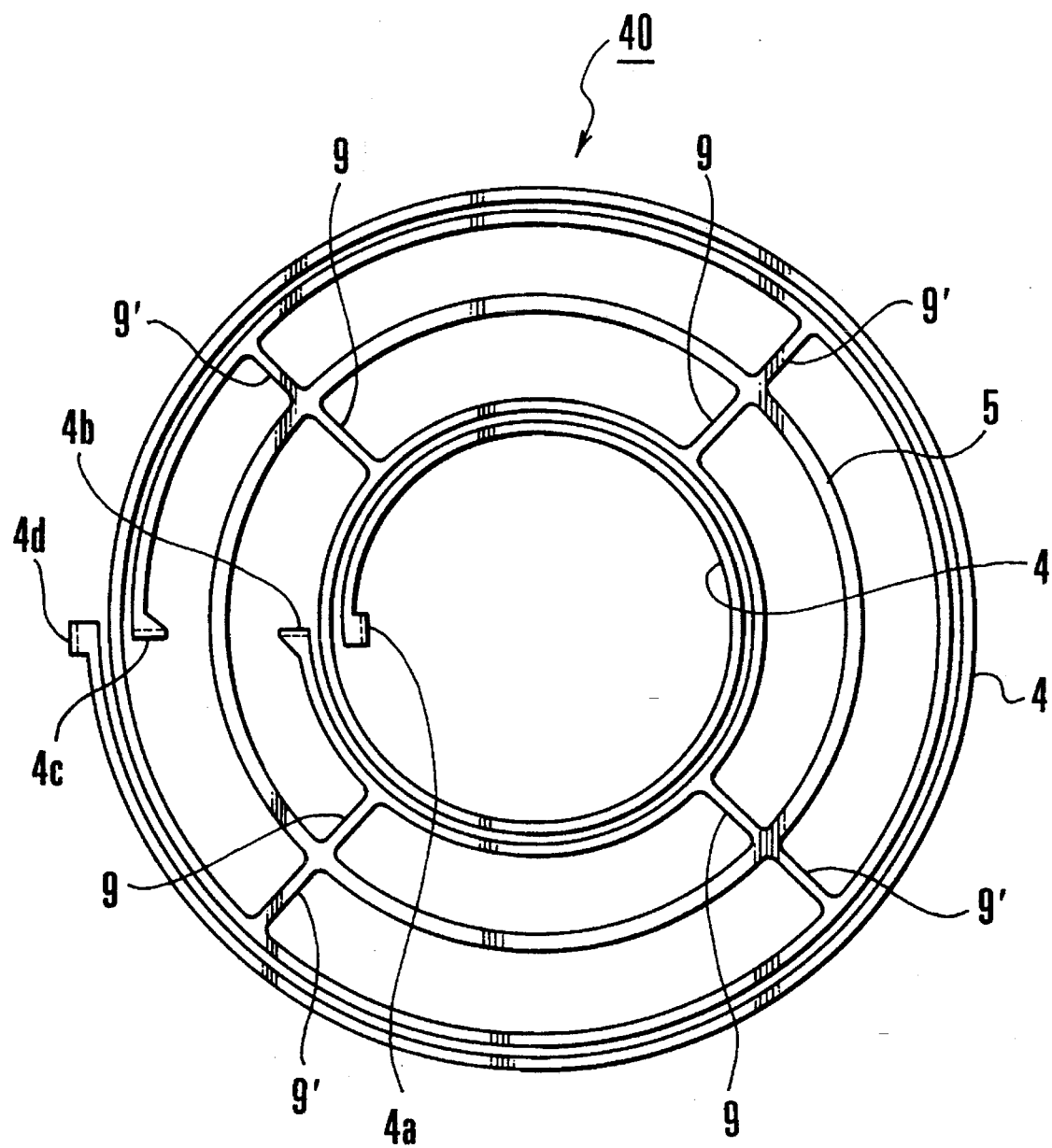
FIG. 7 is a plan view showing an integrally formed winding related to the rotary transformer of this invention.

A rotary transformer which is adapted for a rotary cylinder included in a recording and/or reproducing apparatus and arranged according to this invention is described with reference to FIGS. 4 to 7 as follows. In the following, the features of the rotary transformer are mainly described. The rotary transformer can be advantageously used for the rotary cylinder which is shown in FIG. 1. FIG. 4 is a plan view of the rotary transformer. FIG. 5 is a vertical sectional view taken along a line A—A indicated in FIG. 4. FIG. 6 shows the details of a core. FIG. 7 shows the details of a winding.

Referring to FIGS. 4 and 5, a core 1 is used for forming each of a stator and a rotor of the rotary transformer. A hole 2 is formed to allow the rotary shaft 70 (FIG. 1) to be inserted therethrough. Winding grooves 3 include inner and outer winding grooves 3a and 3b which are formed concentrically with the hole 2. A winding 4 is formed within each of the winding grooves 3a and 3b. A short-circuit ring 5 is arranged within a groove 3' which is formed between the winding grooves 3a and 3b. In the case of this embodiment, the rotary transformer is arranged to be of a two-channel 'type. Hence, the winding 4 includes two windings. One winding is disposed on the inner side and the other on the outer side.

An adhesive 6 (FIG. 5) is used for fixing the windings 4 and the short-circuit ring 5 to the core 1. Through holes 7 are formed for pulling out the end parts (or lead parts) 4a, 4b, 4c and 4d of the windings 4 to a surface of the core 1 located on one side opposite to the opposed surface 1a of the core 1. In the case of this embodiment, four holes 7 are arranged in alignment in the radial direction of the core 1 as shown in FIGS. 4 and 5. Escape holes 8 and 8' are formed for separating the windings 4 and the short-circuit ring 5 from each other by a post-machining process. The escape holes 8 (four holes in this case) are formed and arranged between the inner winding 4 and the short-circuit ring 5 while the escape holes 8' (four holes in this case) are formed and arranged between the outer winding 4 and the short-circuit ring 5.

FIG. 6 shows by way of example the core 1 as arranged in one single body. As shown, with the hole 2 formed in the center, the winding groove 3a, the groove 3' and the winding groove 3b are formed one after another.

FIG. 7 shows a manner in which the inner and outer windings 4 and the short-circuit ring 5 are integrally formed (hereinafter referred to as the integrally formed winding 40). The integrally formed winding 40 is formed by etching or press working or the like. Further, in the integrally formed winding 40, connection parts 9 interconnect the inner winding 4 and the short-circuit ring 5, while other connection parts 9' interconnect the short-circuit ring 5 and the outer winding 4. The connection parts 9 and 9' are arranged respectively in positions corresponding to the above-stated escape holes 8 and 8'. The connecting parts 9 and 9' will be seen to be comprised of parts protruding from winding 4 and ring 5.

In the case of the rotary transformer in this embodiment, the integrally formed winding 40 is fixed by the adhesive 6 to the winding groove 3a, the groove 3' and the winding groove 3b in such a manner as to make the connection parts 9 and 9' adequately match with the escape holes 8 and 8'. In this instance, each of the lead parts 4a, 4b, 4c and 4d is pulled out to the surface of one side opposite to the opposed surface 1a of the core 1 (FIG. 5). The connection parts 9 and 9' which are arranged in positions corresponding to the escape holes 8 and 8' are divided, for example, by punching the integrally formed winding 40, in such a way as to separate the windings 4 and the short-circuit ring 5 from each other. Two channels are thus formed independently of each other with the short-circuit ring 5 interposed in between them.

The integrally formed winding 40 is preferably formed by a press working process using a thin sheet copper material of approximately uniform thickness. In this instance, the lead parts 4a, 4b, 4c and 4d are also formed at the same time integrally with the integrally formed winding 40. After that, the windings 4 and the short-circuit ring 5 are cut and separated from each other by using the escape holes 8 and 8'. The arrangement of the embodiment described above permits in-line assembly including the cementing and channel separating processes on the core 1 at the time of obtaining the integrally formed winding 40 by press working.

While the 2-channel type rotary transformer has been described as the embodiment of this invention, the same advantageous effects are attainable by applying this invention to a rotary transformer of a type having a greater number of channels than two channels.

As described in the foregoing, in accordance with the arrangement of the embodiment, winding parts are integrally formed. The integrally formed winding is mounted on the core. After the mounting, the integrally formed winding is separated into individual winding parts. The invented arrangement dispenses with the conventional winding process, permits reduction in number of cementing processes and thus reduction in cost of manufacture. In addition to this advantage, the invented arrangement permits in-line assembly in carrying out the press working process. Therefore, the cost can be reduced to a great extent also in this respect.

What is claimed is:

1. A rotary transformer arranged to transmit signals between a rotor and a stator, comprising:
   (a) a pair of cores arranged to form said rotor and said stator, each of said pair of cores being in a cylindrical shape; and
   (b) a plurality of windings secured to one end face of each of said pair of cores, each of said windings being in a flat plate shape, the center of each of said windings approximately coinciding with the center of each of said pair of cores, said windings differing in coil diameter, and said windings being provided respectively with protruding parts which are aligned in a radial direction of said cores, said protruding parts respective free ends radially spaced from one another within an outer perimeter of said plurality of windings.

2. A rotary transformer according to claim 1, further comprising a ring which is disposed between said windings and is of the same thickness as that of said windings.

3. A rotary transformer according to claim 2, wherein said ring has a protruding part, said protruding part being disposed in alignment with the protruding parts of said windings.

4. A rotary transformer according to claim 3, wherein each of said pair of cores is provided with a hole formed in a position located between the protruding part of said ring and the protruding part of said winding located adjacent to said ring.

5. A rotary transformer according to claim 4, wherein said windings are made from a copper sheet by press working.

6. A rotary cylinder device having a head for recording and/or reproducing information on or from a tape, comprising:
   (a) a rotary cylinder having said head mounted thereon;
   (b) a stationary cylinder arranged to rotatably support said rotary cylinder; and
   (c) a rotary transformer, including:
      a rotor which is in a cylindrical shape and is mounted on said rotary cylinder;
      a stator which is in a cylindrical shape and is mounted on said stationary cylinder; and
      a plurality of windings which are secured to each of respective opposed faces of said rotor and said stator, each of said windings being in a flat plate shape, the center of each of said plurality of windings approximately coinciding with the center of said rotor, said plurality of windings differing in coil diameter, and said plurality of windings being respectively provided with protruding parts which are aligned in a radial direction of said rotor and that of said stator, said protruding parts respective free ends radially spaced from one another within an outer perimeter of said plurality of windings.

7. A device according to claim 6, further comprising a ring which is disposed between said windings and is of the same thickness as that of said windings.

8. A device according to claim 7, wherein said ring has a protruding part, said protuding part being disposed in alignment with the protruding parts of said windings.

9. A device according to claim 8, wherein each of said rotor and said stator is provided with a hole formed in a position located between the protruding part of said ring and the protruding part of said winding located adjacent to said ring.

10. A device according to claim 9, wherein said windings are made from a copper sheet by press working.

11. A recording and/or reproducing apparatus having a head for recording and/or reproducing information on or from a tape, comprising:
    (a) a rotary cylinder device having said head mounted thereon;
    (b) a stationary cylinder arranged to rotatably support said rotary cylinder; and
    (c) a rotary transformer, including:
       a rotor which is in a cylindrical shape and is mounted on said rotary cylinder;
       a stator which is in a cylindrical shape and is mounted on said stationary cylinder; and
       a plurality of windings which are secured to each of respective opposed faces of said rotor and said stator, each of said windings being in a flat plate shape, the center of each of said plurality of windings approximately coinciding with the center of said rotor, said plurality of windings differing in coil diameter, and said plurality of windings being respectively provided with protruding parts which are aligned in a radial direction of said rotor and that of said stator, said protruding parts respective free ends radially spaced from one another within an outer perimeter of said plurality of windings.

12. An apparatus according to claim 11, further comprising a ring which is disposed between said windings and is of the same thickness as that of said windings.

13. An apparatus according to claim 12, wherein said ring has a protruding part, said protruding part being disposed in alignment with the protruding parts of said windings.

14. An apparatus according to claim 13, wherein each of said rotor and said stator is provided with a hole formed in a position located between the protruding part of said ring and the protruding part of said winding located adjacent to said ring.

15. An apparatus according to claim 14, wherein said windings are made from a copper sheet by press working.

16. A core assembly for a rotary transformer, comprising:
    (a) a core having a cylindrical shape; and
    (b) a plurality of windings secured to one end face of said core, each of said windings being in a flat plate shape, the center of each of said windings approximately coinciding with the center of said core, said windings differing in coil diameter, and said windings being provided respectively with protruding parts which are aligned in a radial direction of said core, said protruding parts respective free ends radially spaced from one another within an outer perimeter of said plurality of windings.

* * * * *

UNITED STATES PATENT AND TRADEMARK OFFICE
CERTIFICATE OF CORRECTION

PATENT NO. : 5,587,859
DATED : December 24, 1996
INVENTOR(S) : Nagatsuka, Osamu

It is certified that error appears in the above-identified patent and that said Letters Patent is hereby corrected as shown below:

Col. 3, line 67, delete " 'type " and insert -- type --.

Signed and Sealed this

Ninth Day of June, 1998

Attest:

BRUCE LEHMAN

Attesting Officer

Commissioner of Patents and Trademarks